United States Patent [19]

Tilley

[11] Patent Number: 5,839,335

[45] Date of Patent: Nov. 24, 1998

[54] SAW BLADE LUBRICATING APPARATUS

[76] Inventor: Robert W. Tilley, 21710 Moortown Cir., Katy, Tex. 77450

[21] Appl. No.: 742,354

[22] Filed: Nov. 1, 1996

[51] Int. Cl.[6] ................................ B26D 7/08; F01M 5/00
[52] U.S. Cl. .......................... 83/169; 83/170; 83/522.11; 184/38.2; 184/104.1; 184/105.2; 222/333; 222/390
[58] Field of Search .............................. 83/169, 168, 170, 83/76.1, 76.6, 76.9, 522.11; 184/38.2, 104.1, 105.2; 222/333, 390

[56] References Cited

U.S. PATENT DOCUMENTS

| | | | |
|---|---|---|---|
| 2,722,245 | 11/1955 | Clampitt | 83/169 X |
| 2,726,688 | 12/1955 | Flood | 83/169 |
| 3,557,848 | 1/1971 | Wright | 83/169 |
| 3,915,651 | 10/1975 | Nishi | 222/333 X |
| 4,269,331 | 5/1981 | Watson | 222/390 |
| 4,878,601 | 11/1989 | Flemming et al. | 222/333 X |
| 4,967,963 | 11/1990 | Brown | 83/169 X |
| 5,054,582 | 10/1991 | Aracil | 184/3.2 |
| 5,271,528 | 12/1993 | Chien | 184/38.4 X |
| 5,305,853 | 4/1994 | Ross et al. | 184/3.2 |
| 5,620,060 | 4/1997 | Bialke | 184/104.1 |
| 5,630,527 | 5/1997 | Beebe et al. | 222/333 X |
| 5,634,531 | 6/1997 | Graf et al. | 222/333 X |

OTHER PUBLICATIONS

Unimist advertising Brochure, no date.

*Primary Examiner*—Eugenia A. Jones
*Attorney, Agent, or Firm*—Michael B. Jolly

[57] ABSTRACT

An apparatus for continuously lubricating operating circular and band saw blades with solid or semisolid lubricant. The lubricant contacts both sides of the blade by use of opposing lubricant tube ends and further said apparatus has a single loading cylinder with automated lubricant feeding circuitry in addition to expendable lubricant feeding tube ends which are advanced after damage caused by blade breakage.

5 Claims, 4 Drawing Sheets

SAW BLADE LUBRICATING APPARATUS

BACKGROUND OF THE INVENTION

This invention is an apparatus for lubricating metal cutting circular and band saw blades while the saw is in operation. The device automatically dispenses solid or semisolid lubrication medium at a desired location on the moving saw blade providing hands free operation.

Both circular and band saws are employed by the metal industry for continuously cutting or trimming aluminum and other nonferrous and ferrous metals. These saws operate at high speeds creating saw blade friction which both damages the blade and slows the cutting process. Lubricating the blade or the metal to be cut helps reduce the friction and increases the overall performance of the cutting operation. Prior devices such as Uni-MIST™ have been developed which deliver an atomized liquid lubrication medium to a cutting apparatus such as a saw, additionally devices have been developed in the railroad industry for continuously applying lubricants in a stick form to railroad car wheels, as in U.S. Pat. Nos. 5,305,853 and 5,054,582. Additionally, the inventor has found that it is common industry practice for a saw operator to apply lubricant to a running saw blade by rubbing the moving blade with a solid block of tallow. In the aluminum industry a solid lubricant is the preferred medium for lubricating saw blades since liquid lubricants are unable to be localized in application resulting in saturating the shavings with lubricating medium which interferes with the recycling process. The railroad car wheel lubricators are effective in applying a single stick or multiple sticks to a surface to be lubricated however, saw blades must be lubricated on opposing sides evenly. Additionally, a continuous saw blade lubricator must be able to withstand the damaging effects of band saw blade breakage which can damage machinery in the path of a moving broken blade.

The present invention provides an apparatus which is adaptable on both circular and band saws which continuously lubricates the operating saw blade through expendable opposing lubrication tubing ends which deliver semisolid or solid lubrication medium directly on the saw blade and which device has a single reloading cylinder with electronic circuitry controlling lubricant delivery speed, which apparatus can be adapted for use on both ferrous and nonferrous metal cutting saws.

SUMMARY OF THE INVENTION

It is accordingly an object of the present invention to provide an apparatus which is adaptable on both circular and band saws which continuously lubricates the operating saw blade through expendable opposing lubrication tubing ends which deliver semisolid or solid lubrication medium directly on the saw blade and which device has a single reloading cylinder and electronic circuitry controlling lubricant delivery speed.

It is a further object of the invention to provide an apparatus which provides a means for selectively delivering solid or semisolid lubricant to opposing sides of an operating circular or band saw.

DETAILED DESCRIPTION OF THE DRAWINGS

While the present invention will be described fully hereinafter with reference to the accompanying drawings, in which a particular embodiment is shown, it is to be understood at the outset that persons skilled in the art may modify the invention herein described while still achieving the desired result of the invention. Accordingly, the description which follows is to be understood as a broad informative disclosure directed to persons of skill in the appropriate arts and not as limitations upon the present invention.

Figure 1:
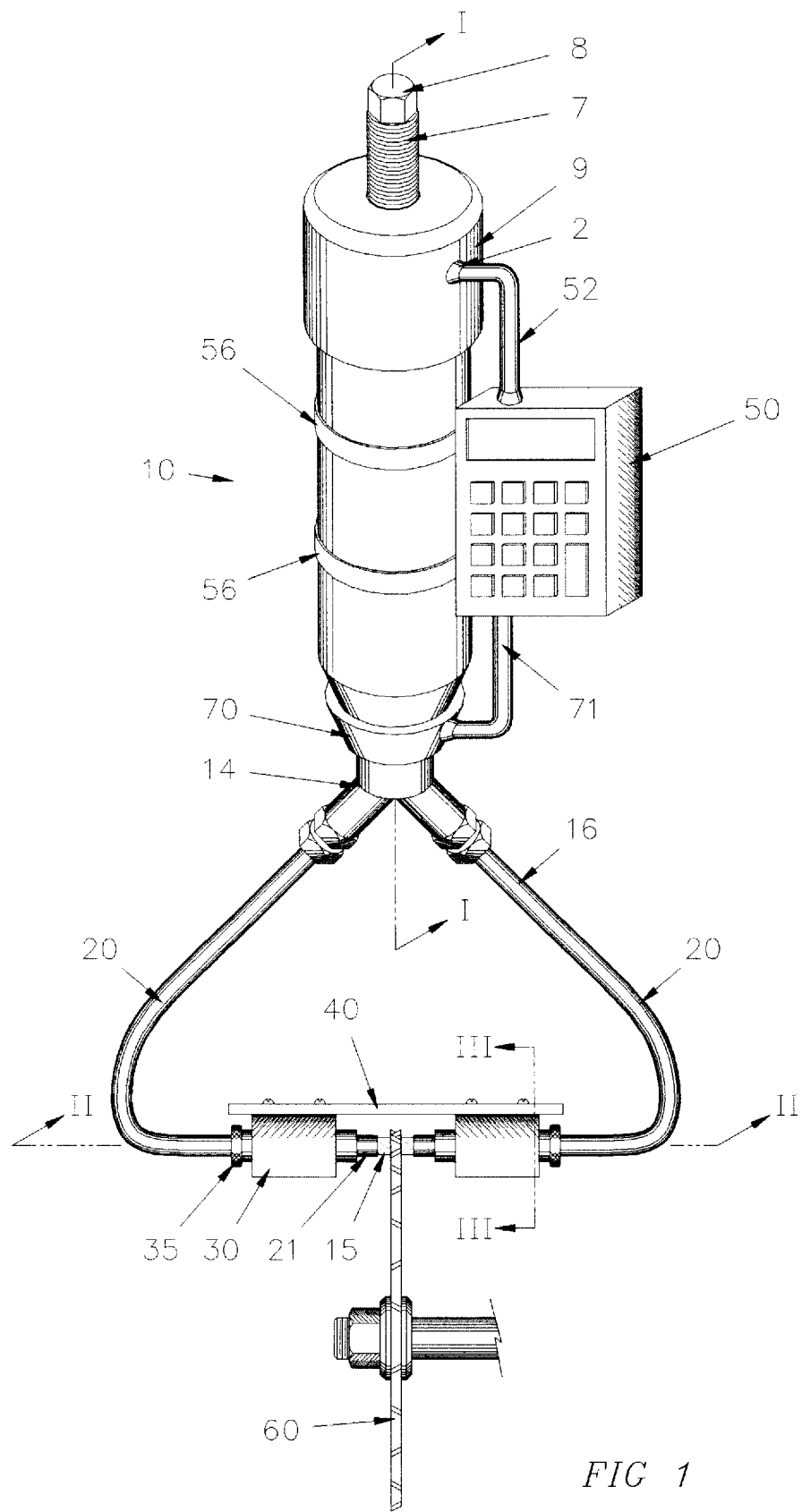
FIG. 1 is a perspective view of the apparatus illustrating its application upon a circular saw blade.

FIGS. 1 illustrates the lubricating apparatus generally comprising a lubricant canister 10, clamping blocks 30, and control unit 50. The canister 10 is a reservoir for lubricant 15 to be delivered via tubing 20 to the clamping blocks 30 which blocks maintain the end of the tubing 21 in close proximity with a saw blade 60 so that the lubricant 15 is deposited upon the rotating saw blade 60.

The canister 10 functions as a lubricant reservoir and is constructed cylindrically of light weight durable material such as aluminum, and further has a top 11 which is open and a bottom end 12 which is conical in shape with a central aperture 13. The canister 10 is from about 1½ to about 3½ inches in diameter, has a internal bore of about 1⅛ to about 3 inches in diameter and further is about 3 to about 18 inches long. A means for delivering the lubricant from the canister 10 to the saw blade 60 includes a "Y" connection 14, tubing 20, tubing support tube 32, and clamping blocks 30. [A] The "Y" connection 14 is fixedly secured to central aperture 13 which provides a passageway for lubricant 15 to exit the canister 10 and be divided into two lubricant 15 streams. Multiple "Y"s or other means for providing multiple streams of lubricant may be provided if it is desired to place more than two lubricators on the saw blade. Two separate pieces of plastic tubing 20 are connected to each leg of the "Y" connection 14 by a conventional tubing connection means 16. The tubing connection 16 may include a compression fitting, swage lock connection, a butt connection or some other suitable connection fitting. The tubing 20 is composed of plastic, either polypropylene, polyethylene, polyvinylchloride, nylatron, or some other suitable commercial plastic. It is most preferable that the plastic tubing 20 does not extrude and further that the tubing 20 have sufficient flexibility to adapt the apparatus upon saws with different dimensions. The tubing 20 further has an internal diameter of about ¼ to about 1 inch and the tubing length should be in excess of what is required for installation of the apparatus upon a saw. The end of each piece of tubing 21 which is in close proximity to the saw blade 60 is connected to two separate identical clamping blocks 30. The clamping blocks 30 are blocks used to secure the ends of the tubing 21 and further to securely position the tubing ends 21 in close proximity to the saw blade 60 to be lubricated. The tubing ends 21 should be placed close enough to the moving saw blade 60 so that the exiting lubricant 15 will be placed upon the moving saw blade 60. If the tubing end 21 is not close enough to the saw blade 60 then the exiting lubricant 15 will not come into contact with the blade 60 because the lubricant 15 will be unable to bridge the gap between the tubing end 21 and the blade 60. It is preferred that the gap between the tubing end 21 and the saw blade 60 be between about ⅛ and about 1 inch depending upon the hardness of the lubricant medium 15. While it is necessary to place the tubing end 21 close to the saw blade 60 for proper lubricant application, this also places the tubing end 21 in harms path if the apparatus is applied to a band saw and the band saw's blade breaks. The tubing ends 21 are therefore considered expendable or sacrificial and the damaged tubing end can be trimmed with a cutting device and new tubing slid through the clamping blocks 30 into position. The sacrificial tubing ends provide a means for preventing the remainder of the lubricant delivery means from being rendered inoperable by a moving saw blade, since a damaged tubing end can be quickly severed and new tubing slid into place through the clamping blocks 30. Providing extra length tubing 20 allows for repeated repair of the damaged tubing ends 21. The clamping blocks 30 have a receiving aperture 31 for receiving the tubing 20 and a tubing support tube 32. The blocks 30 further are partially split 33 with a clamping screw 34 which when tightened squeezes the tubing support tube 32. The tubing support tube 32 is composed of a durable material such as steel or stainless steel and has a gripping knurled end 35 providing a means for handling the tube when the clamping block 30 is loosened and tightened. The support tube 32 further provides a support for the plastic tubing end 21 so that the tubing end 21, which is flexible, can be maintained in a desired position. The support tube 32 should be long enough to extend from about ¼ to about 1 inch from the clamping block, additionally the support tube 32 should have an internal bore which snugly receives the tubing 20, so that moderate pressure is required to displace the tubing 20 within the support tube 32 once the tube 20 is positioned. The blocks 30 are securely positioned on each side of the saw blade 60 by use of a mounting plate 40, the configuration of the mounting plate 40 will vary depending upon the saw model which the apparatus will be installed.

Figure 2:
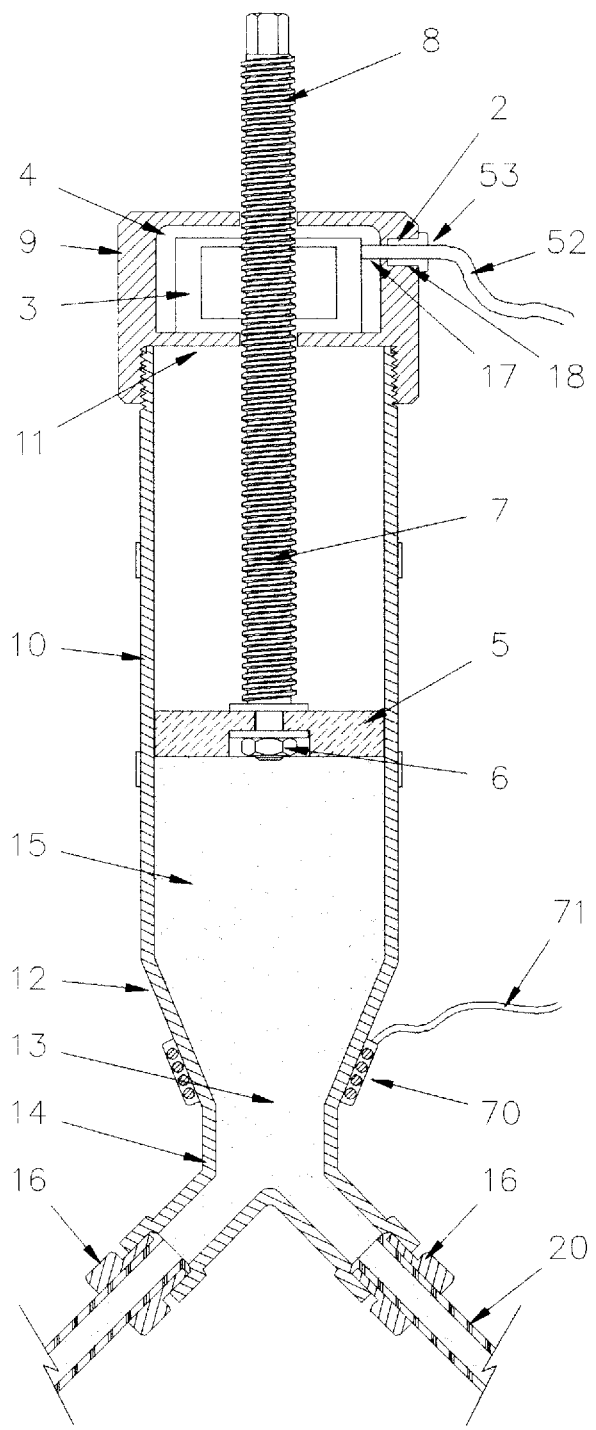
FIG. 2 is a cross section of the lubricant canister taken along line I of FIG. 1.
Figure 3:
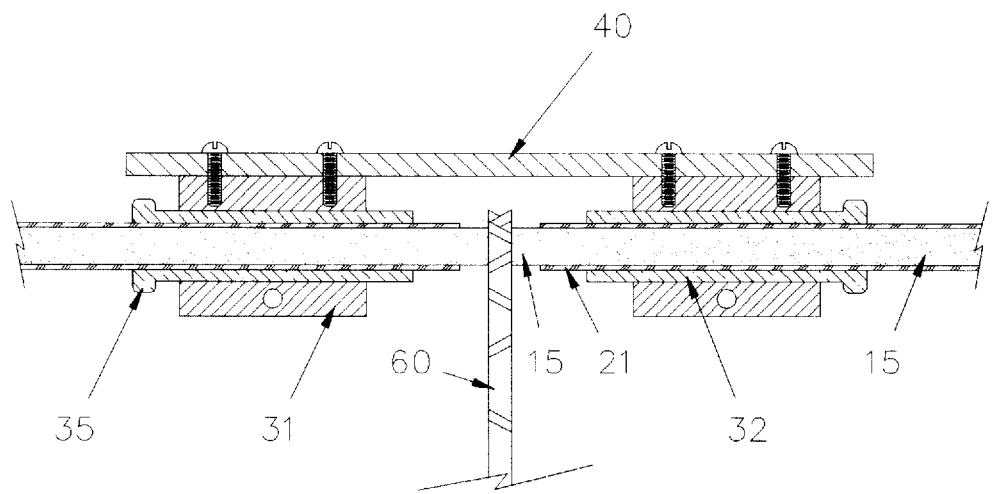
FIG. 3 is a cross section of the clamping blocks taken along II of FIG. 1.
Figure 4:
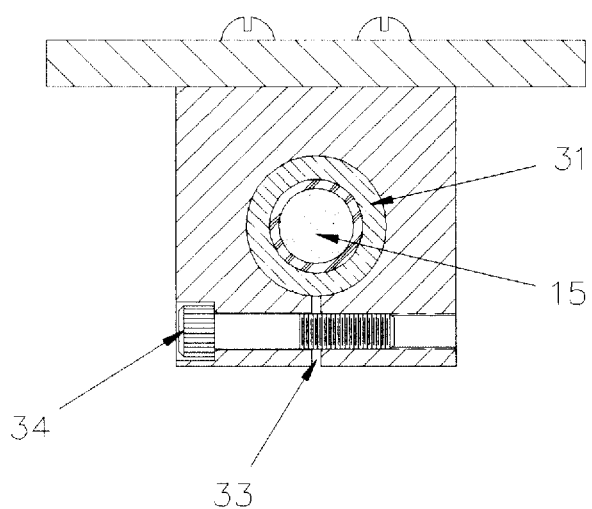
FIG. 4 is an end cross sectional view of the clamping blocks and lubricant tubing taken along III of FIG. 1.
Figure 5:
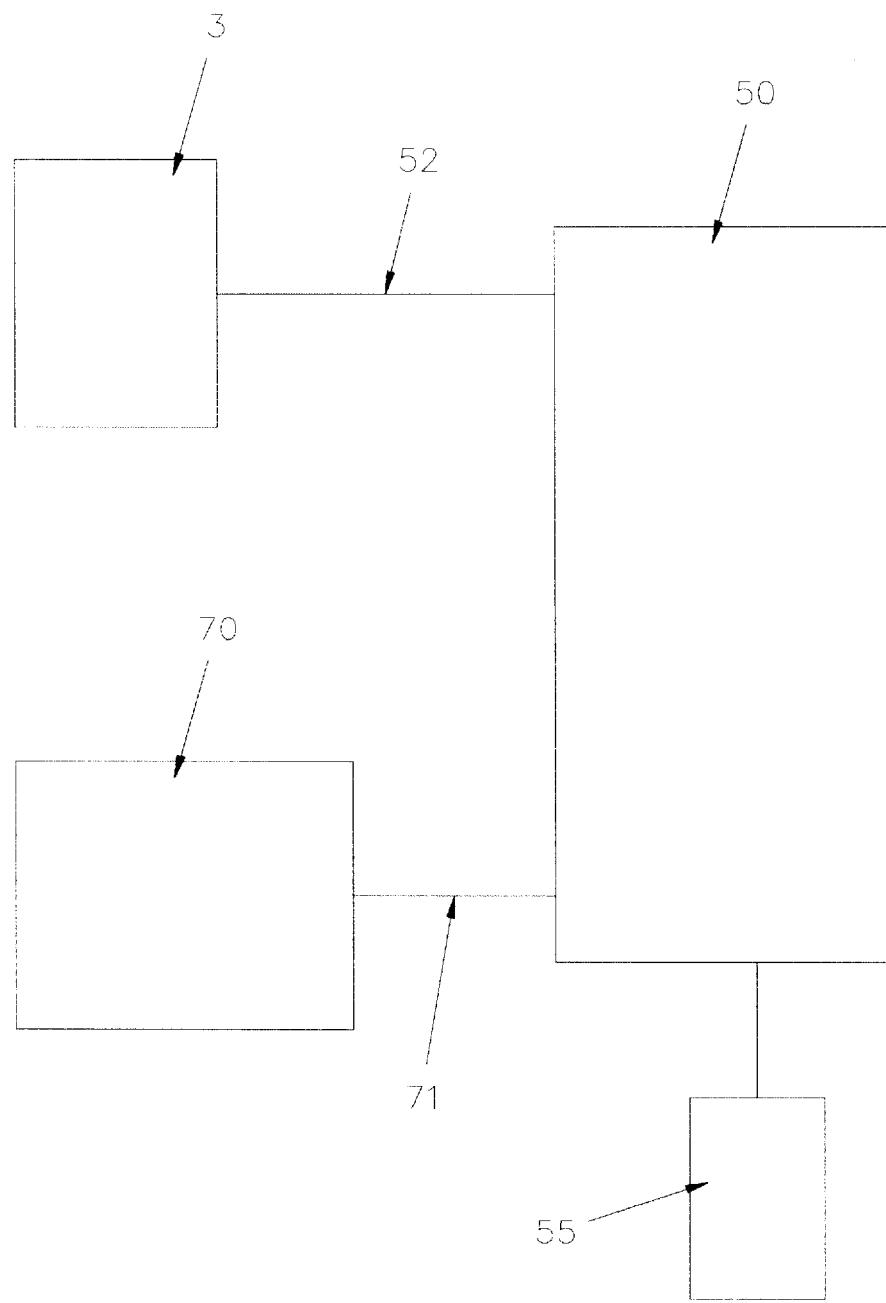
FIG. 5 is a diagram of the electrical components of the apparatus.

A means for displacing the lubricant from [The lubricant delivery system includes] the canister 10, includes a canister cap 9, a piston 5, a threaded ram 7, and a stepper motor 3. [, the control unit 50 and the before mentioned tubing system]. A canister cap 9 is positioned upon the top end 11 of the canister 10 and threaded to be securely attached to the canister 10, the canister cap 9 further is constructed with a cavity 4 which cavity 4 contains the stepper motor 3. The stepper motor 3 is known to the industry and most preferable is a DC motor with a means for linearly moving the threaded ram 7. The threaded ram 7 is a continuously threaded rod of metal with a means for securing the piston on one end, said means most preferable being a low friction connection so that limited drag is experienced when the piston is under load and the threaded ram is being rotated. As disclosed in FIG. 2 the piston 5 and ram 7 connection 6 includes a threaded portion of the ram 7 and a securing nut with multiple slip washers on either side of the connection. While the piston is constructed of a durable material such as nylatron or aluminum. The threaded ram 7 further includes a manual rotating means 8 positioned on the end of the threaded ram 7 and includes a geometrically deminsioned portion end 8 for connecting a wrench. A means is provided for controlling the stepper motor operation speed and the lubricant delivery rate and temperature. The stepper motor 3 is controlled by controller 50 and connected electrically via motor wire 17. The motor wire 17 travels through cap aperture 18 to a quick disconnect connection 2 so that control wiring connector 53 can be easily and quickly disconnected before removing the cap 9. Controller 50 has a power source 55 which is either standard electrical utility power or an internal battery power source. The controller 50 has a data entry means such as a key board which allows the user to enter desired stepper motor speed and further a means for controlling temperature of the lubricant 15 in the conical section of the canister 10. A temperature increasing means 70 is wrapped around the conical section of the canister 10. The heating means 70 is a conventional electrical resistance heater, or heating mantel, which is wired to the controller 50 with wiring 71. The controller 50 controls the temperature of the conical area so that the lubricant 15 in the canister 10 in the conical area will become more fluid and easier to be pumped into the "Y" and into the tubing 20. The controller 50 is further attached on the canister 10 by bands 56 which wrap around the canister 10, other attachment means may be employed. The controller 50 further is equipped with a readout means which indicates lubricant delivery speed, temperature, in addition to the amount of lubricant used and or lubricant left in the canister.

The apparatus is loaded by first disconnecting the wiring quick disconnect 53 and unscrewing the cap 9 from the canister 10. When the cap 9 is removed the stepper motor 3, threaded ram 7 and piston 5 are all removed with the cap 9 as a unit. Lubricant medium is placed in the canister 10 and the threaded ram 7 is then manually screwed so the piston 5 is backed out far enough to allow replacement of the cap 9. The cap 9 is screwed into place and the wiring reconnected. The piston 5 can now be brought back into place with the lubricant medium 15 either manually or electronically by use of controller 50. The controller 50 can be used to either fast forward or reverse the threaded ram 7 during the canister loading sequence. The tubing ends 21 are adjusted for proper gaping between the saw blade, if necessary the lubricant 15 temperature in the conical section of the canister is brought to a desired temperature, and then the controller is set at a desired rate which advances lubricant 15 from the tubing ends 21 sufficiently to lubricate the saw blade.

I claim:

1. In combination, a sawing device having a saw blade and an apparatus for lubricating the saw blade with solid and semisolid lubricant, said apparatus comprising:

a) a single reloadable lubricant reservoir, wherein said reservoir comprises an aluminum cylindrical canister with a smooth internal bore, said internal bore being about 1½ to about 3 inches in diameter and said canister being about 3 to about 18 inches long, said canister having top and bottom ends, said top end being open for loading the canister with new lubricant, said open end having male threads, the bottom end further comprising a conical section, said conical section having a central conical aperture where lubricant exits the canister, and a female threaded canister cap attached to said canister with said male threads, b) means for displacing said lubricant from said reservoir, said displacement means comprising a piston disposed within said canister bore, a threaded ram rotatably secured to said piston, a stepper motor, and a mechanical connection means engaging the stepper motor with the threaded ram, said engaging means causing the threaded ram to move linearly in relation to a longitudinal axis of the canister bore as the stepper motor operates, said linear ram motion causing said piston to move within said bore when movement of the piston is in the direction of the canister lubricant exit causing lubricant in the canister between the piston and the canister exit end to be displaced from the canister into the canister conical section and out the conical central aperture, the canister cap further providing a means for mounting said stepper motor and threaded ram so that when the cap is removed from the canister, the motor, threaded ram, and piston are also removed from the canister, c) means for delivering said displaced lubricant to opposite sides of the saw blade, said delivery means comprising a "Y" tubing connection connected to said conical central aperture, two pieces of plastic tubing, each piece of tubing having two ends, one end of each piece of plastic tubing connected to each leg of the "Y" connection and the other end of each piece being open and the two open ends of the plastic tubing opposing each other with a gap between said open ends wherein said saw blade is positioned in the gap between said open ends, two clamping blocks, for holding the plastic tubing open ends in position a mounting member for mounting the clamping blocks on the opposite sides of the saw blade, said blocks having an aperture therethrough, said block apertures each having a longitudinal axis which is perpendicular to a planar axis of the saw blade, and a tubing support member received in each block aperture, said tubing support members each being constructed of stainless steel and having an internal aperture therethrough for snugly receiving the respective piece of plastic tubing, said clamping blocks each being partially split providing a means for clamping the respective tubing support member, d) a means for controlling the lubricant delivery and delivery rate, said delivery control means comprising an electronic control means, a power supply, and wiring connecting said power supply, control means and stepper motor, further said control means providing a means for controlling the operation, direction and speed of the stepper motor and lubricant delivery rate in addition to providing a memory and means for mathematically manipulating historic and anticipated stepper motor operation and lubricant delivery rate, said control means further providing a digital readout depicting stepper motor function and lubricant delivery rate.

2. Apparatus as set forth in claim 1 wherein said plastic tubing is constructed of polypropylene, polyethylene, polyvinylchloride or nylatron.

3. Apparatus as set forth in claim 1 wherein said piston is constructed of aluminum, or nylatron.

4. Apparatus as set forth in claim 1 wherein said apparatus includes a lubricant heating means positioned to heat said lubricant as the lubricant enters the conical section.

5. Apparatus as set forth in claim 1 wherein the apparatus further comprises a lubricant heating mantel wrapped around the conical section which heating mantel heats the lubricant as it enters the conical section and further comprising wiring connecting the heating mantel with the electronic control means, and further providing a control means for controlling the temperature of the lubricant in the conical section.

\* \* \* \* \*